United States Patent [19]
Orndorff

[11] 3,786,282
[45] Jan. 15, 1974

[54] RADIATION HARDENED FLIP FLOP

[75] Inventor: Ross M. Orndorff, Fullerton, Calif.

[73] Assignee: Hughes Aircraft Company, Culver City, Calif.

[22] Filed: June 16, 1971

[21] Appl. No.: 153,680

Related U.S. Application Data

[63] Continuation of Ser. No. 75,396, Sept. 25, 1970, abandoned.

[52] U.S. Cl. .................. 307/291, 307/202, 307/215, 307/238, 328/206

[51] Int. Cl. ....................... H03k 19/36, H03k 3/286

[58] Field of Search ..................... 328/206; 307/202, 307/215, 238, 291

[56] References Cited

UNITED STATES PATENTS

| | | | |
|---|---|---|---|
| 3,458,825 | 7/1969 | Lagemann | 328/206 |
| 3,597,629 | 8/1971 | Bartlett | 328/206 |
| 3,466,618 | 9/1969 | Bartlett et al. | 307/291 |
| 3,510,689 | 5/1970 | Baker | 307/238 |
| 2,982,870 | 5/1961 | Hilbiber | 307/238 |
| 3,604,956 | 9/1971 | Cooke | 307/293 |
| 3,553,485 | 1/1971 | Hassett | 307/202 |

*Primary Examiner*—Benjamin A. Borchelt
*Assistant Examiner*—H. A. Birmiel
*Attorney*—W. H. MacAllister and John M. May

[57] ABSTRACT

A semiconductor flip flop capable of operating before, during and after an ionizing radiation environment. The radiation hardening is achieved by use of a capacitive memory in the cross coupled feedback loop of the flip flop circuit to drive the flip flop back to its pre-irradiation state.

7 Claims, 3 Drawing Figures

PATENTED JAN 15 1974 3,786,282

SHEET 1 OF 2

Ross M. Orndorff,
INVENTOR.
BY.
Bernard P. Drachlis
ATTORNEY

RADIATION HARDENED FLIP FLOP

This application is a Continuation of Ser. No. 75,396, filed Sept. 25, 1970, and now abandoned.

BACKGROUND OF THE INVENTION

This relates generally to radiation hardened circuits and more particularly to a radiation hardened flip flop. It is well known that semiconductor gates of a flip flop are erroneously saturated in the presence of a radiation ionizing environment. This causes a loss of the pre-irradiation stored data since an unhardened flip flop has no way of determining its pre-irradiation output state.

Techniques which have been used for hardening flip flops against an ionizing radiation environment include dielectric isolation, photocurrent compensation, narrow base width, and wide beam all-aluminum construction. These techniques have resulted in flip flops hardened against an ionizing environment of from one to two orders of magnitude greater than unhardened flip flops are capable of withstanding.

SUMMARY OF THE INVENTION

The present invention is a radiation hardened flip flop which uses a capacitive memory in the cross coupled feedback loop of the flip flop circuit to retain the pre-irradiation voltage state of the flip flop output during the time that the transistors of the flip flop are erroneously saturated as a result of the ionizing radiation environment. When the ionizing radiation environment is no longer present, the capacitive memory is used to drive the flip flop back to its pre-irradiation state. The invention may be applied to any type of semiconductor flip flop which may be fabricated in integrated circuit form or discrete component form. The invention may also be used with thin film and metal oxide semiconductor (MOS) techniques. The invention may be used with an RS flip flop of JK flip flop. It may also be a single section type or a master/slave dual section flip flop. The flip flop may have either positive or negative logic levels.

An additional advantage of the present invention is that the radiation hardness is achieved without an increase of power consumption.

DESCRIPTION OF THE PREFERRED EMBODIMENTS

Figure 1:
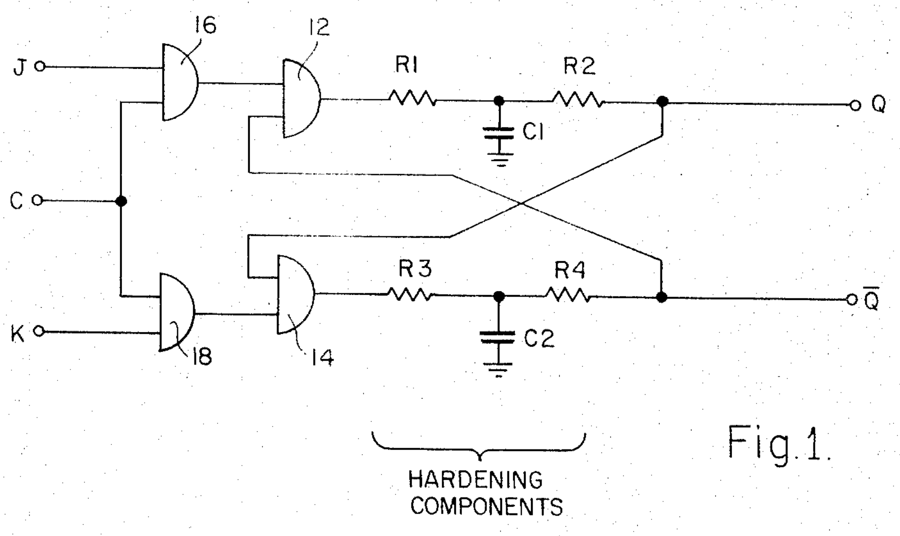
FIG. 1 shows one embodiment of a radiation hardened flip flop of the present invention.

FIG. 1 shows a radiation hardened flip flop utilizing the techniques of the present invention. The flip flop is shown as being constructed from NAND logic gates which will hereinafter be described as gates. It should be understood that any other convenient type of flip flop circuit may be used to practice the present invention.

Ignoring the radiation hardening components for a moment, a gate 12 and a gate 14 are interconnected in a standard RS flip flop arrangement. The output of gate 12 is cross coupled to one input of gate 14. Similarly, the output of gate 14 is cross coupled to one input of gate 12. The output of a gate 16 is coupled to a second input of gate 12. Similarly, the output of a gate 18 is coupled to a second input of gate 14. One input of gate 16 is coupled to receive the J input to the flip flop. Similarly, one input of gate 18 is coupled to receive the K input of the flip flop. A second input of gate 16 and a second input of gate 18 are coupled to receive a common clock input C to the flip flop. Thus, the combination of gates 12, 14, 16 and 18 form a standard JK flip flop.

In accordance with the present invention resistive and capacitive hardening components are inserted in the output circuits of the flip flop. For example, in FIG. 1, a resistor R1 is coupled to the output terminal of gate 12. A resistor R2 is coupled in series circuit relationship with resistor R1 and in turn coupled to the set output terminal Q of the flip flop. A capacitor C1 has one terminal coupled to the common inter-connection of resistors R1 and R2 and its other terminal coupled to ground. In a similar manner, a resistor R3 is coupled to the output terminal of gate 14. A resistor R4 is coupled in series circuit relationship with resistor R3 and in turn coupled to the reset output terminal $\bar{Q}$ of the flip flop. A capacitor C2 has one terminal coupled to the common interconnection of resistors R3 and R4 and its other terminal connected to ground.

The hardening resistors R1, R2, R3 and R4 and capacitors C1 and C2 provide an analog voltage memory which returns the flip flop output to its pre-irradiation state. The function of the hardening capacitors C1 and C2 is to reatin the pre-irradiation voltage state of the flip flop during the time that the transistors of the flip flop are erroneously saturated as a result of the ionizing radiation environment. The function of the hardening resistors R1, R2, R3 and R4 is to delay the discharge of the pre-irradiation voltage stored in the hardening capacitors C1 and C2 when the transistors of the flip flop are erroneously saturated. The output voltage of gate 12 is stored in capacitor C1 and is fed back into one input of gate 14. Similarly, the output voltage of gate 14 is stored in capacitor C2 and is fed back into one input of gate 12.

The operation of the circuit of FIG. 1 will now be described. The NAND gates operate to provide a logic 1 output voltage when either of the inputs to the gate are at logic 0 voltage and to provide a logic 0 output voltage when both inputs to the gate are a logic 1 voltage. To set the flip flop, the J input and the clock input C to gate 16 of the flip flop are logic 1. In this condition, gate 16 provides a logic 0 at its output terminal. Gate 12 will have the logic 0 output from the gate 16 output terminal applied to its input and there-fore the output terminal of gate 12 is logic 1. The logic 1 output of gate 12 charges the capacitor C1 to the logic 1 voltage level. The logic 1 level is also applied to one input of gate 14. The K input is at the logic 0 level and therefore the output terminal of gate 18 is at the logic 1 level. Since both inputs of gate 14 are at logic 1, the output terminal of gate 14 is at logic 0. Capacitor C2 is charged to the logic 0 voltage level. Logic 0 is also applied to the second input of gate 12, thus keeping the output terminal of gate 12 at logic 1. In this condition, the flip flop is said to be in the set state. That is, the set output terminal Q is at logic 1 and the reset output terminal $\bar{Q}$ is at logic 0.

Now assume that the flip flop is exposed to an ionizing radiation environment. All transistors in the logic gates will saturate and drive the outputs of the logic gates to incorrect logic levels. When the ionizing radiation environment is no loger present, it will be assumed that there are no inputs to the flip flop. Thus the output terminal of gate 16 is logic 1 and the output terminal of gate 18 is logic 1. The logic 1 voltage level on capacitor C1 is applied to gate 14. Both inputs of gate 14 are logic 1. The output terminal of gate 14 is therefore logic 0. Thus, logic 0 is applied to one input of gate 12. Since at least one input of gate 12 is logic 0, the output terminal of gate 12 is logic 1. This reestablishes the set state of the flip flop which was present prior to the ionizing radiation environment.

To reset the flip flop, the K input and the clock input C to gate 18 of the flip flop are logic 1. In this condition, the output terminal of gate 18 is logic 0. This logic 0 is applied to one input of gate 14 and since at least one input of gate 14 is logic 0, the output terminal of gate 14 is logic 1. This logic 1 level charges capacitor C2 to the logic 1 voltage and is applied to one input of gate 12. Since the flip flop is being reset, the J input is logic 0 and the output terminal of gate 16 is logic 1. Thus, both inputs to gate 12 are logic 1 and the output terminal of gate 12 is logic 0. This is applied to one input of gate 14 to keep the output of gate 14 at logic 1. This is the reset state of the flip flop. The set output Q is logic 0 and the reset output $\bar{Q}$ is logic 1.

Again, assume that the flip flop is exposed to an ionizing radiation environment. Again, all transistors will saturate and the outputs of the logic gates will be erroneous. When the flip flop is removed from the ionizing radiation environment, it will be assumed that there are no inputs to the flip flop. The logic 1 level on capacitor C2 is applied to one input of gate 12. Since the J input is logic 0, the output terminal of gate 16 is logic 1. Both inputs to gate 12 are logic 1 and the output terminal of gate 12 is logic 0. This is applied to one input of gate 14 and makes the output terminal of gate 14 logic 1. The reset state of the flip flop has thus been reestablished after the removal of the ionizing radiation environment.

Figure 2:
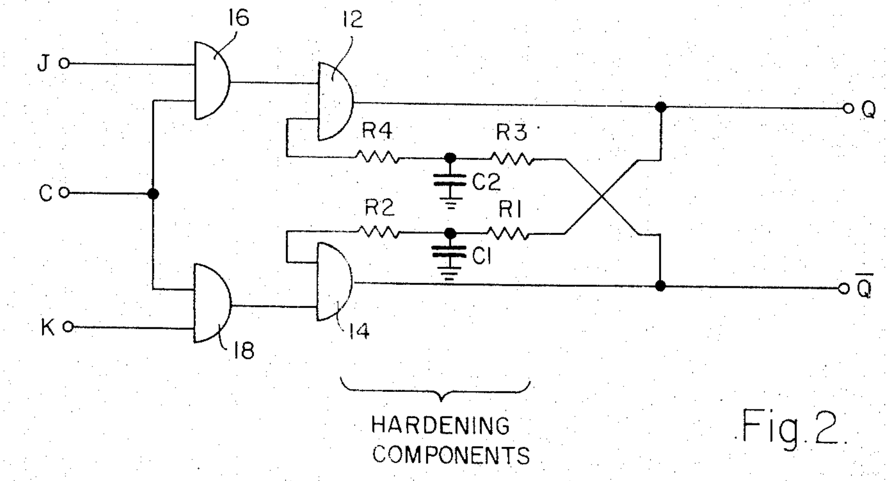
FIG. 2 shows a second embodiment of a radiation hardened flip flop of the present invention.

FIG. 2 shows a second embodiment of the present invention. The radiation hardening components are connected between the output terminals of the flip flop and the cross coupled gate input. Thus, resistors R1, R2 and capacitor C1 are connected between the set output terminal Q and the input to gate 14. Likewise, resistors R3, R4 and capacitor C2 are connected between the reset output terminal $\bar{Q}$ and the input to gate 12. The operation of the circuit shown in FIG. 2 is identical to the operation of the circuit shown in FIG. 1. The location of the hardening components in FIG. 2 has an advantage over that shown in FIG. 1 since the hardening resistors do not significantly contribute to the logic 0 noise margin.

Figure 3:
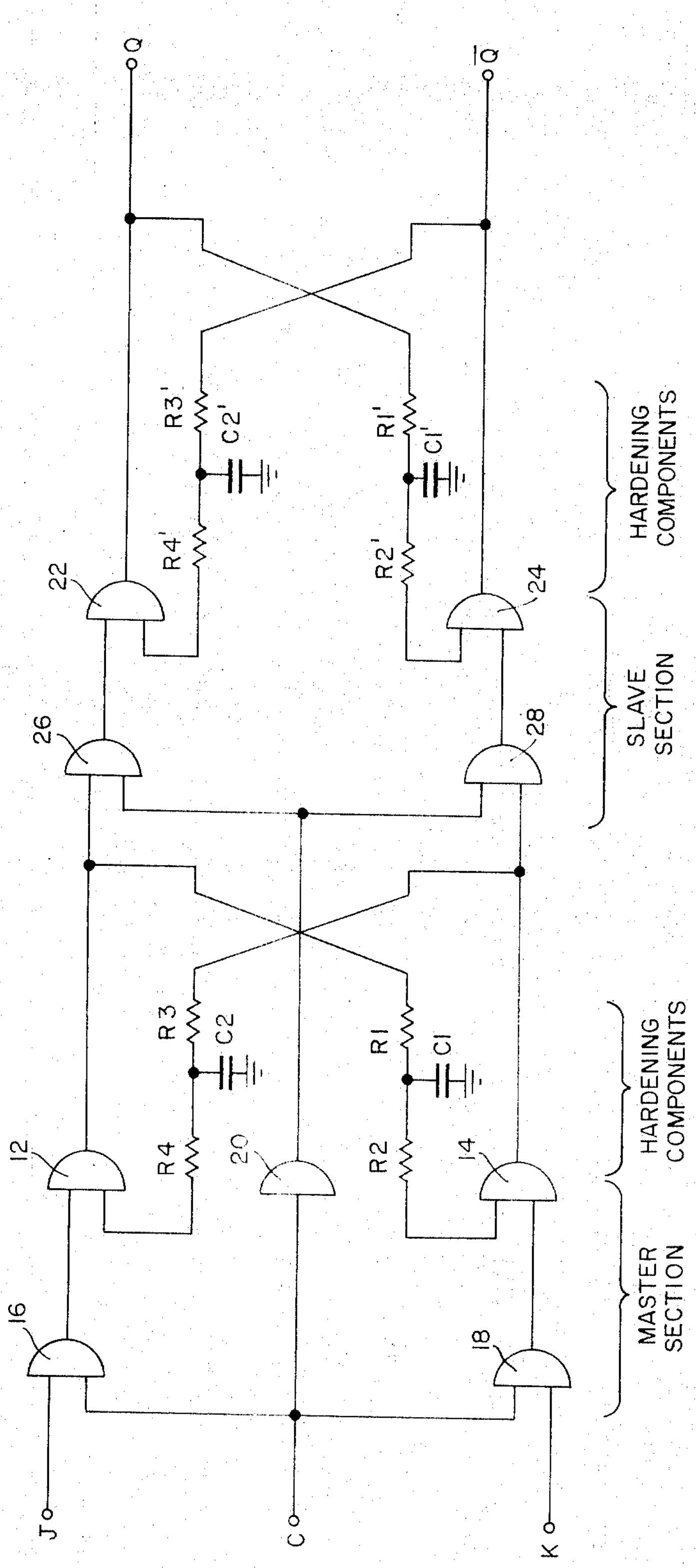
FIG. 3 shows a master/slave radiation hardened flip flop utilizing the present invention.

FIG. 3 shows a master/slave flip flop embodiment of the present invention. The master section of the flip flop is composed of gates 12, 14, 16, and 18 and hardening components R1, R2, R3, R4 and C1 and C2 interconnected to form a flip flop identical to that shown in FIG. 2. The slave section of the flip flop is composed of gates 22, 24, 26 and 28 and hardening components R1', R2', R3', R4', C1' and C2' interconnected to form a flip flop identical to that shown in FIG. 2. The outputs of the master section are applied to the inputs of the slave section of the flip flop. The master/slave flip flop further includes a gate 20 which is coupled to receive the clock pulse input C which is applied to gates 16 and 18 of the master section of the flip flop. Gate 20 provides an inverted clock pulse which is applied to gates 26 and 28 of the slave section of the flip flop. The master section of the flip flop and the slave section of the flip flop each operate in a manner identical to that described above for the flip flop shown in FIG. 2. The only difference in the operation of the flip flop is that the master section will change states when a clock pulse input is applied to the flip flop and the slave section will change states at a time when the clock pulse input is not being applied to the flip flop.

If an ionizing radiation environment is present during the time that a clock pulse is applied to the flip flop and the flip flop is changing state, the information in the flip flop may be irretrievably lost due to the fact that the capacitors may not have been able to charge to the proper level before the ionizing radiation environment occurs. However, this problem is overcome with the master/slave configuration because either the master section or the slave section will be in a stable condition at all times, that is, the master section and the slave section will not change states at the same time. Therefore, when an ionizing radiation environment is present, at least one section of the master/slave flip flop will be able to return to its preirradiation state.

The capacitors C1 and C2 retain the pre-irradiation voltage state of the flip flop if the time required for the charge on the hardening capacitors to decay below the logic 1 level is longer than the radiation induced saturation time. The rate of discharge of the voltage stored in the memory hardening capacitors C1 and C2 is essentially determined by the values of the resistors R1, R2, R3 and R4. The duration of that discharge is the summation of the radiation pulse width plus the semiconductor radiation storage time. The values of the hardening resistors R1, R2, R3 and R4 are chosen as large as possible without interfering with the signal-to-noise ratio in the zero or low voltage state.

The capacitors decrease or suppress the maximum flip flop operating speed. The components which determine the maximum operating speed are the hardening capacitors C1 and C2, the hardening resistors R1, R2, R3 and R4, and the pullup resistors of the gate driving the storage capacitor. The value of the hardening capacitors C1 and C2 is chosen as large as possible without interfering with the desired maximum operating speed. The maximum operating speed is traded off against a gain in radiation hardness with no increase in power requirement.

As noted above, any convenient type of semiconductor flip flop may utilize the present invention. As an example, the gates shown in the exemplary flip flops described above may be LPDT μL 9046 NAND gates manufactured by Fairchild Semiconductor Corporation. The hardening capacitors C1 and C2 may be 100–1000 picofarads, for example. The hardening resistors R1, R2, R3 and R4 may be 470 ohms, for example.

What is claimed is:

1. A radiation hardened flip flop having set and reset inputs and set and reset outputs comprising:

a first gate means coupled to receive the set input and reset output of said flip flop for directly providing the set output;

a second gate means coupled to receive the reset input and the set output of said flip flop for directly providing the reset output;

first and second resistors interconnected in series circuit relationship and coupled to feed said set output to said second gate means, including a first capacitor coupled between the common interconnection of said first and second resistors and a reference voltage level for retaining the set output voltage of said flip flop during the presence of an ionizing radiation environment;

third and fourth resistors interconnected in series circuit relationship and coupled to feed said reset output to said first gate means, including a second capacitor coupled between the common interconnection of said third and fourth resistors and said reference voltage level for retaining the reset output voltage of said flip flop during the presence of an ionizing radiation environment.

2. A radiation hardened flip flop as claimed in claim 1 wherein said first gate means and said second gate means are NAND gates.

3. A radiation hardened flip flop as claimed in claim 1 wherein said reference voltage level is ground voltage level.

4. A radiation hardened flip flop having set and reset inputs and set and reset outputs comprising:

a first gate means coupled to directly receive the set input and the reset output of said flip flop and coupled to provide the set output;

a second gate means coupled to directly receive the reset input and the set output of said flip flop and coupled to provide the reset output;

first and second resistors interconnected in series circuit relationship and coupled to feed the output of said first gate means to the set output of said flip flop, including a first capacitor coupled between the common interconnection of said first and second resistors and a reference voltage level for retaining the set output voltage of said flip flop during the presence of an ionizing radiation environment;

third and fourth resistors interconnected in series circuit relationship and coupled to feed the output of said second gate means to the reset output of said flip flop, including a capacitor coupled between the common interconnection of said third and fourth resistors and a reference voltage level for retaining the reset output voltage of said flip flop during the presence of an ionizing radiation environment.

5. A radiation hardened flip flop as claimed in claim 4 wherein said first gate means and said second gate means are NAND gates.

6. A radiation hardened flip flop as claimed in claim 4 wherein said reference voltage level is ground voltage level.

7. A radiation hardened flip flop circuit comprising:

a first flip flop coupled to receive a set input, a reset input and a clock input for providing a set output in response to the set input and the clock input and for providing a reset output in response to the reset input and the clock input;

a first capacitive voltage storage means coupled to receive the set output of said first flip flop for retaining the output voltage of the set output during the presence of an ionizing radiation envrionment;

a second capacitive voltage storage means coupled to receive the reset output of said first flip flop for retaining the output voltage of the reset output during the presence of an ionizing radiation environment;

gate means coupled to receive the clock input for providing an inverted clock signal;

a second flip flop coupled to receive the set output and reset output of said first flip flop and the inverted clock signal of said gate means for providing a set output in response to the set output of said first flip flop and the inverted clock signal and for providing a reset output in response to the reset output of said first flip flop and the inverted clock signal;

a third capacitive voltage storage means coupled to receive the set output of said second flip flop for retaining the output voltage of the set output during the presence of an ionizing radiation environment;

a fourth capacitive voltage storage means coupled to receive the reset output of said second flip flop for retaining the output voltage of the reset output during the presence of an ionizing radiation environment.

* * * * *